US010579241B2

(12) United States Patent
Gross et al.

(10) Patent No.: US 10,579,241 B2
(45) Date of Patent: Mar. 3, 2020

(54) OPTIMIZING WINDOW MOVE ACTIONS FOR REMOTED APPLICATIONS

(71) Applicant: VMware, Inc., Palo Alto, CA (US)

(72) Inventors: Adam Gregory Gross, Dexter, MI (US); Michael Dunn, Menlo Park, CA (US); Christopher Rude, Seattle, WA (US); Joshua Kwan, New York, NY (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/105,172

(22) Filed: Aug. 20, 2018

(65) Prior Publication Data
US 2018/0356966 A1 Dec. 13, 2018

Related U.S. Application Data

(63) Continuation of application No. 14/717,898, filed on May 20, 2015, now Pat. No. 10,082,941.

(51) Int. Cl.
G06F 3/048 (2013.01)
G06F 3/0484 (2013.01)
(Continued)

(52) U.S. Cl.
CPC .......... G06F 3/04845 (2013.01); G06F 3/038 (2013.01); G06F 3/03543 (2013.01);
(Continued)

(58) Field of Classification Search
CPC .......................................... G06F 3/0481–0489
See application file for complete search history.

(56) References Cited

U.S. PATENT DOCUMENTS 6,018,340 A  1/2000 Butler et al.
6,271,839 B1 * 8/2001 Mairs .................... G06F 3/1462
                                                         715/807
(Continued)

OTHER PUBLICATIONS

Final Office Action dated Sep. 26, 2018; U.S. Appl. No. 15/081,678; (20 pgs.).
(Continued)

Primary Examiner — Steven B Theriault

(57) ABSTRACT

Techniques for optimizing window move actions for a remoted application are provided, where the remoted application has an application window running within a remote desktop of a server system, and where the application window is made accessible to a user of a client system in the form of a client-side application window displayed in a client desktop of the client system. In one embodiment, the client system can receive from the server system a notification that the application window has begun moving in the remote desktop, and can determine that the user is currently entering one or more input commands for moving the client-side application window in the client desktop. The client system can further send a command to the server system for stopping the movement of the application window in the remote desktop, such that the application window is fixed in a stationary position. The client system can then allow the user to continue moving the client-side application window in the client desktop, while the application window remains in the stationary position in the remote desktop.

21 Claims, 12 Drawing Sheets

(51) Int. Cl.
*G06F 3/038* (2013.01)
*G09G 5/14* (2006.01)
*G06F 9/451* (2018.01)
*G06F 3/0354* (2013.01)
*G06F 3/14* (2006.01)
*G09G 5/377* (2006.01)
*H04L 29/08* (2006.01)

(52) U.S. Cl.
CPC ............ *G06F 3/1415* (2013.01); *G06F 9/452* (2018.02); *G09G 5/14* (2013.01); *G09G 5/377* (2013.01); *H04L 67/10* (2013.01); *G06F 3/1454* (2013.01); *G06F 2203/0383* (2013.01); *G09G 2340/0464* (2013.01); *G09G 2350/00* (2013.01)

(56) References Cited

U.S. PATENT DOCUMENTS

| | | | |
|---|---|---|---|
| 6,710,790 B1 | 3/2004 | Fagioli | |
| 6,850,249 B1 | 2/2005 | Gu | |
| 7,168,048 B1 | 1/2007 | Goosen et al. | |
| 7,477,205 B1* | 1/2009 | de Waal | G06F 3/1431 345/1.1 |
| 7,484,183 B2 | 1/2009 | Look et al. | |
| 7,533,189 B2 | 5/2009 | Mahajan | |
| 7,791,559 B2* | 9/2010 | Piasecki | G06F 16/9577 345/1.1 |
| 8,127,233 B2 | 2/2012 | McDowell | |
| 8,176,434 B2 | 5/2012 | Saul | |
| 8,341,208 B2 | 12/2012 | Mazzaferri | |
| 8,549,093 B2 | 10/2013 | Cohen | |
| 8,713,474 B2 | 4/2014 | Desai | |
| 8,769,428 B2 | 7/2014 | Mir | |
| 8,774,536 B1 | 7/2014 | Jia et al. | |
| 8,970,492 B2 | 3/2015 | Butner | |
| 9,032,325 B2 | 5/2015 | Janssen | |
| 9,225,611 B1 | 12/2015 | Bagrinovskiy | |
| 9,395,869 B2 | 7/2016 | Holland | |
| 9,406,281 B2* | 8/2016 | Lee | G06F 3/1423 |
| 9,635,091 B1 | 4/2017 | Laukkanen | |
| 9,674,265 B2 | 6/2017 | Agrawal | |
| 2002/0057295 A1 | 5/2002 | Panasyuk et al. | |
| 2002/0165922 A1 | 11/2002 | Wei | |
| 2002/0169743 A1 | 11/2002 | Arnold et al. | |
| 2003/0061333 A1 | 3/2003 | Dean et al. | |
| 2003/0085922 A1 | 5/2003 | Wei | |
| 2005/0168471 A1* | 8/2005 | Paquette | G09G 5/14 345/536 |
| 2006/0069797 A1 | 3/2006 | Abdo et al. | |
| 2006/0136828 A1* | 6/2006 | Asano | G06F 3/1454 715/733 |
| 2006/0136835 A1 | 6/2006 | Hochmuth et al. | |
| 2006/0195791 A1 | 8/2006 | Johanson et al. | |
| 2006/0230156 A1 | 10/2006 | Shappir et al. | |
| 2006/0267857 A1 | 11/2006 | Zhang et al. | |
| 2006/0288306 A1 | 12/2006 | Mahajan et al. | |
| 2007/0139373 A1 | 6/2007 | Simon | |
| 2007/0171921 A1 | 7/2007 | Wookey et al. | |
| 2007/0174410 A1 | 7/2007 | Croft et al. | |
| 2008/0155454 A1 | 6/2008 | Balasubramanian | |
| 2008/0168479 A1* | 7/2008 | Purtell | G06F 9/45558 719/328 |
| 2009/0070404 A1 | 3/2009 | Mazzaferri | |
| 2009/0094523 A1 | 4/2009 | Treder et al. | |
| 2009/0119365 A1 | 5/2009 | Tomic | |
| 2009/0210817 A1 | 8/2009 | Schmieder | |
| 2010/0056173 A1 | 3/2010 | Bloom et al. | |
| 2010/0207957 A1* | 8/2010 | Taneja | G09G 5/397 345/592 |
| 2010/0253693 A1* | 10/2010 | Streatch | G06F 9/451 345/548 |
| 2010/0271379 A1 | 10/2010 | Byford | |
| 2011/0099481 A1 | 4/2011 | Bitonti | |
| 2011/0115800 A1 | 5/2011 | Desai | |
| 2011/0138295 A1 | 6/2011 | Momchilov | |
| 2011/0157189 A1* | 6/2011 | Diard | G06T 1/00 345/502 |
| 2011/0219313 A1 | 9/2011 | Mazzaferri | |
| 2011/0219331 A1 | 9/2011 | Deluca | |
| 2011/0246904 A1* | 10/2011 | Pinto | G06F 9/452 715/740 |
| 2011/0271226 A1 | 11/2011 | Janssen | |
| 2012/0001832 A1 | 1/2012 | Braghis et al. | |
| 2012/0002715 A1 | 1/2012 | Matsui et al. | |
| 2012/0005269 A1 | 1/2012 | Janssen | |
| 2012/0054671 A1 | 3/2012 | Thompson | |
| 2012/0092277 A1* | 4/2012 | Momchilov | G06F 3/038 345/173 |
| 2012/0127206 A1 | 5/2012 | Thompson | |
| 2012/0143993 A1 | 6/2012 | Russo et al. | |
| 2012/0242574 A1 | 9/2012 | Munehiro et al. | |
| 2012/0319927 A1 | 12/2012 | Khatib | |
| 2013/0031481 A1 | 1/2013 | Schreifels | |
| 2013/0125009 A1 | 5/2013 | Deluca | |
| 2013/0204927 A1 | 8/2013 | Kruglikov | |
| 2013/0290856 A1 | 10/2013 | Beveridge | |
| 2013/0290857 A1 | 10/2013 | Beveridge | |
| 2014/0002361 A1 | 1/2014 | Ballard et al. | |
| 2014/0006634 A1* | 1/2014 | Eacott | H04L 65/1069 709/228 |
| 2015/0031350 A1 | 1/2015 | Haggett et al. | |
| 2015/0127716 A1 | 5/2015 | Agrawal | |
| 2015/0149900 A1 | 5/2015 | Kawabata | |
| 2015/0163281 A1 | 6/2015 | Liu | |
| 2015/0220242 A1 | 8/2015 | Guest et al. | |
| 2015/0363082 A1 | 12/2015 | Zhao | |
| 2016/0072872 A1 | 3/2016 | Li | |
| 2016/0104460 A1 | 4/2016 | Kiichle-Gross et al. | |

OTHER PUBLICATIONS

Final Office Action dated May 15, 2019; U.S. Appl. No. 15/081,678; (17 pgs.).

International Search Report and Written Opinion—PCT/US2016/033272—ISA/EPO—Sep. 20, 2016.

\* cited by examiner

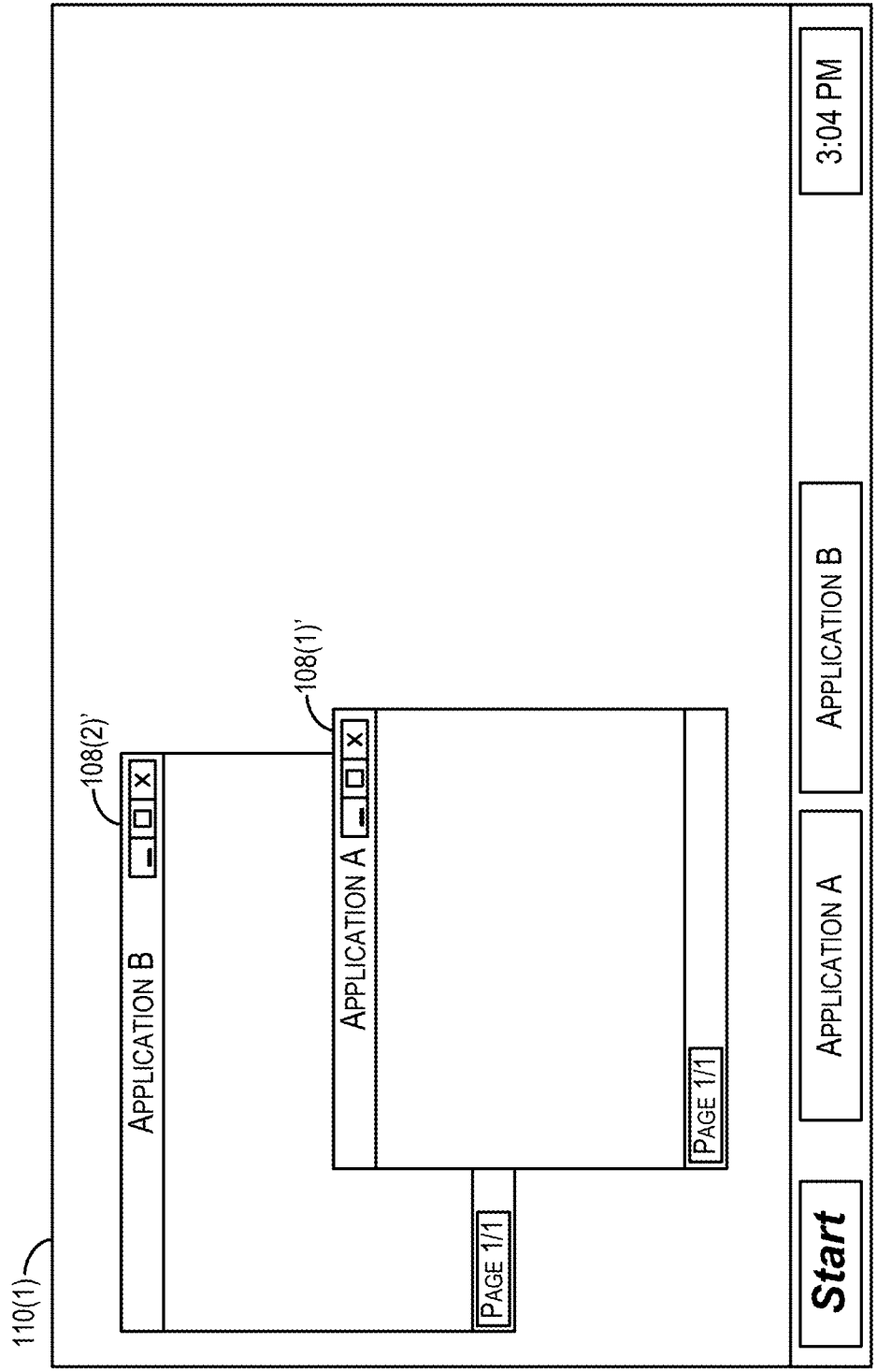

OPTIMIZING WINDOW MOVE ACTIONS FOR REMOTED APPLICATIONS

CROSS-REFERENCE TO RELATED APPLICATIONS

This application is a continuation of U.S. patent application Ser. No. 14/717,898 filed May 20, 2015, now U.S. Pat. No. 10,082,941, issued Sep. 25, 2018, which is wholly incorporated herein by reference.

BACKGROUND

Application remoting, or "app remoting," is a technology that enables an application running in a remote desktop on a server system to be accessed via a client desktop on a client system. Such an application is known as a remoted application. Typically, the remoted application comprises an application window that is presented within the remote desktop. As part of the app remoting process, this application window can be made accessible to a user of the client system in the form of a corresponding window that is rendered in the client desktop (referred to herein as a "client-side application window"). The client-side application window is updated on a continuous basis to mirror the application window in the remote desktop.

In some cases, there may be a large amount of network latency between the client system and the server system while app remoting is taking place. Such latency may be caused by network congestion, geographic distance between the two systems, and/or other factors. In these cases, a user of the client system may experience a noticeable delay when he/she attempts to move the client-side application window, since this move action requires, for each incremental movement of the window: (1) the user's input command(s) to be transferred from the client system to the server system; (2) a window move to be triggered/performed with respect to the application window in the remote desktop in response to the input command(s); and (3) a window move update to be returned from the server system to the client system. High network latency can also cause the window movement to appear jittery to the user, since window move updates may return to the client system in uneven batches.

Certain app remoting implementations address this issue by detecting when the user has initiated a "left-click-and-drag" operation on the titlebar area of the client-side application window (i.e., the portion of the window that includes the window title and windowing-related buttons) and, upon detecting this specific operation, optimizing the window move process on the client side. However, a significant drawback of this approach is that some applications (particularly web browsers) allow window move actions to be initiated using left-click-and-drag on window regions other than the titlebar area. For example, Google Chrome and Internet Explorer allow a user to move its windows using left-click-and-drag on the window region immediately to the right of the active tabs. Accordingly, for these and other similar applications, the titlebar-based optimization approach noted above is not sufficient for optimizing window move actions in all possible scenarios.

SUMMARY

Techniques for optimizing window move actions for a remoted application are provided, where the remoted application has an application window running within a remote desktop of a server system, and where the application window is made accessible to a user of a client system in the form of a client-side application window displayed in a client desktop of the client system. In one embodiment, the client system can receive from the server system a notification that the application window has begun moving in the remote desktop, and can determine that the user is currently entering one or more input commands for moving the client-side application window in the client desktop. The client system can further send a command to the server system for stopping the movement of the application window in the remote desktop, such that the application window is fixed in a stationary position. The client system can then allow the user to continue moving the client-side application window in the client desktop, while the application window remains in the stationary position in the remote desktop.

The following detailed description and accompanying drawings provide a better understanding of the nature and advantages of particular embodiments.

BRIEF DESCRIPTION OF THE DRAWINGS

FIGS. 6A, 6B, and 6C illustrate a background client-side application window and a foreground client-side application window before, during, and after a move of the foreground window according to an embodiment.

DETAILED DESCRIPTION

Figure 1:
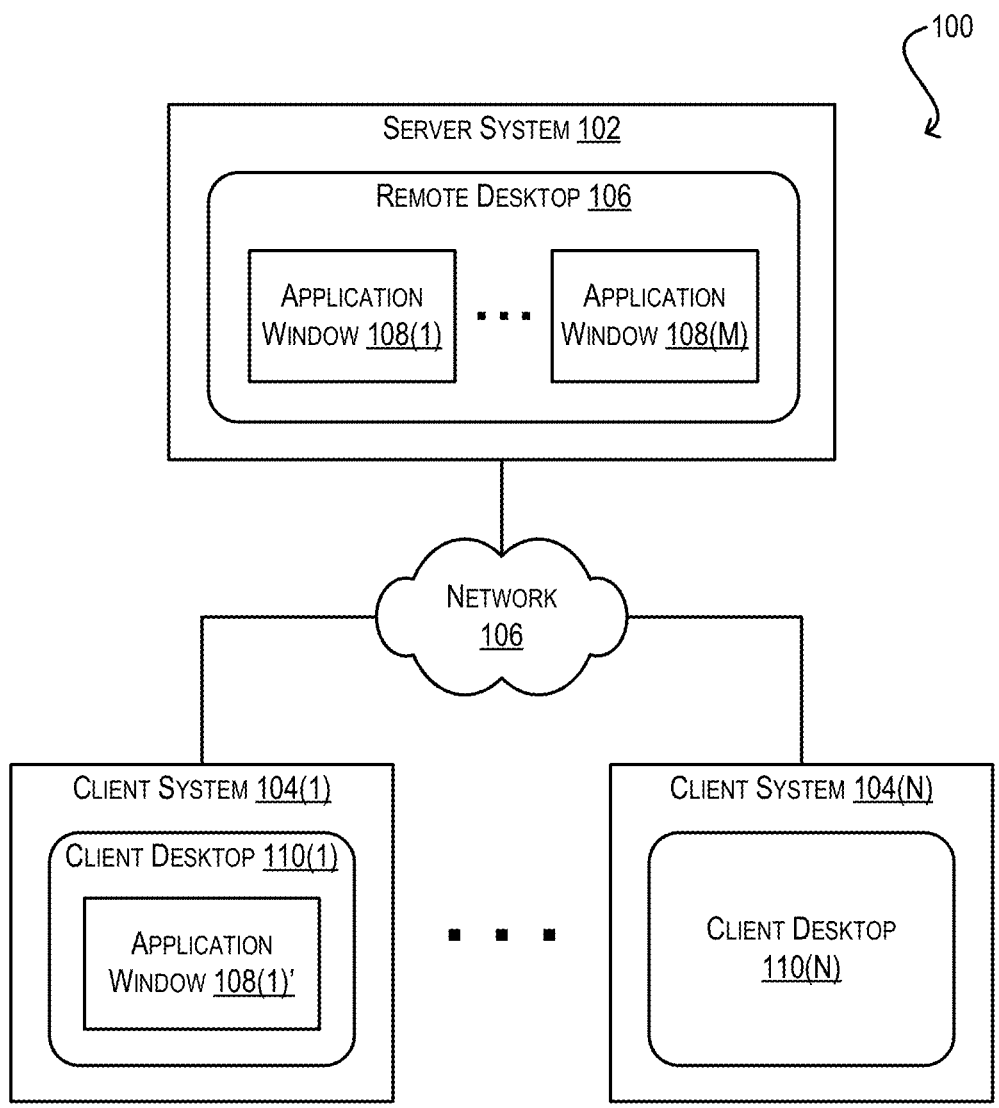
FIG. 1 depicts a system environment according to an embodiment.

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes techniques for optimizing window move actions carried out with respect to remoted applications. In particular, these techniques can reduce the perceived latency of such window move actions on the client side, regardless of how the actions are initiated by a user.

According to one set of embodiments, a client system can receive, from a server system, a notification that an application window of a remoted application (i.e., an application window running within a remote desktop on the server system and presented, in the form of a client-side application window, in a client desktop on the client system) has started to move. For example, a user of the client system may have initiated a left-click-and-drag operation on the client-side application window in the client desktop.

Upon receiving this notification from the server system, the client system can check whether the user is currently entering any input commands that indicate a window move action is taking place with respect to the client-side application window. For instance, the client system can check whether the user currently has the left mouse button held down (indicating a left-click-and-drag operation). If so, the client system can send a command to the server system (e.g., a "left-mouse-button-up" event) that causes the movement of the application window in the remote desktop to be stopped/canceled. This can effectively fix the server-side application window in a stationary position. The client system can then allow the user to continue moving the client-side application window in the client desktop, without synchronizing those client-side movements to the server system.

Once the user has completed the window move action (by, e.g., letting go of the left mouse button), the client system can determine the final position of the client-side application window in the client desktop, which is now different from the position of the application window in the remote desktop. Finally, the client system can send a request to the server system for moving the application window in the remote desktop to the determined final position. In this way, the client system can re-synchronize the positions of the client-side and server-side windows in the two desktops.

With the approach described above, the delay experienced by the user during the window move action can be significantly reduced, particularly in high network latency scenarios. This is because the movement of the client-side application window is handled entirely on the client system, without updating the position of the corresponding application window in the remote desktop until the action is completed. Accordingly, there is no need for the client system to wait for window move updates from the server system before visually displaying the results of those movements on the client side.

Further, since the foregoing approach can be triggered by any window movement (regardless of how that movement is initiated), this approach works well for remoted applications that allow windows to be moved via a variety of methods. This is in contrast to the titlebar-based optimization approach, which does not work well for applications that allow window move actions to be initiated using left-click-and-drag (or other operations) on window regions other than the titlebar area.

Yet further, since the movement of the application window in the remote desktop is canceled/stopped while the client-side application window is being freely moved in the client desktop, the foregoing approach can facilitate the display of window contents on the client side during the move process. For example, in certain embodiments, once the client system has transmitted the "move cancel" command to the server system, the client system can determine a fixed source rectangle for the application window within remote desktop framebuffer updates received from the server system. This fixed source rectangle represents the stationary position of the application window within the remote desktop. The client system can then copy (e.g., blit) the contents of the fixed source rectangle from the received framebuffer updates into the client-side application window, while that window is being moved by the user. This allows the client system to display, in real time or near real time, the current contents of the application window to the user during the move action. Since the position of the source rectangle is stationary, the client system can perform this blitting without having to worry about where the application window is in the remote desktop (and thus, without having to update the position of the source rectangle on an ongoing basis during the move action).

These and other features of the present disclosure are described in further detail in the sections that follow.

FIG. 1 depicts a high-level system environment 100 that supports app remoting according to an embodiment. As shown, system environment 100 includes a server system 102 that is communicatively coupled with a number of client systems 104(1)-(N) via a network 106. Server system 102, which may be a Remote Desktop Session Host (RDSH) server, hosts a remote desktop 106 that includes a number of running applications (shown in the form of application windows 108(1)-(M)). As used herein, a "desktop" is a graphical computing environment in which a user can launch, interact with, and manage his/her applications, settings, and data.

Each client system 104(1)-(N), which may be a desktop computer, a laptop computer, a smartphone, a tablet, or the like, executes its own local (i.e., client) desktop 110(1)-(N). In various embodiments, client systems 104(1)-(N) can interoperate with server system 102 via an app remoting infrastructure (not shown). Through this interoperation, users of client systems 104(1)-(N) can remotely access one or more of the applications of remote desktop 106 via respective client desktops 110(1)-(N). For example, in the embodiment of FIG. 1, application window 108(1) of remote desktop 106 is made accessible to a user of client system 104(1) as a client-side application window 108(1)' in client desktop 110(1). By interacting with application window 108(1)' (which essentially contains a streamed image of server-side application window 108(1)), the user can access the application as if it were running locally on client system 104(1).

It should be appreciated that system environment 100 of FIG. 1 is illustrative and various modifications are possible. For example, although client desktop 110(1) of client system 104(1) is shown as including a single client-side application window 108(1) corresponding to a single server-side application window 108(1) running in remote desktop 106, in other embodiments client desktop 110(1) may include multiple client-side application windows corresponding to multiple server-side application windows. In these embodiments, the multiple server-side application windows may all run in the same remote desktop 106, or in different remote desktops. Further, the various entities shown in FIG. 1 may be arranged according to other configurations and/or may include subcomponents or functions that have not been specifically described. One of ordinary skill in the art will recognize many variations, modifications, and alternatives.

Figure 2:
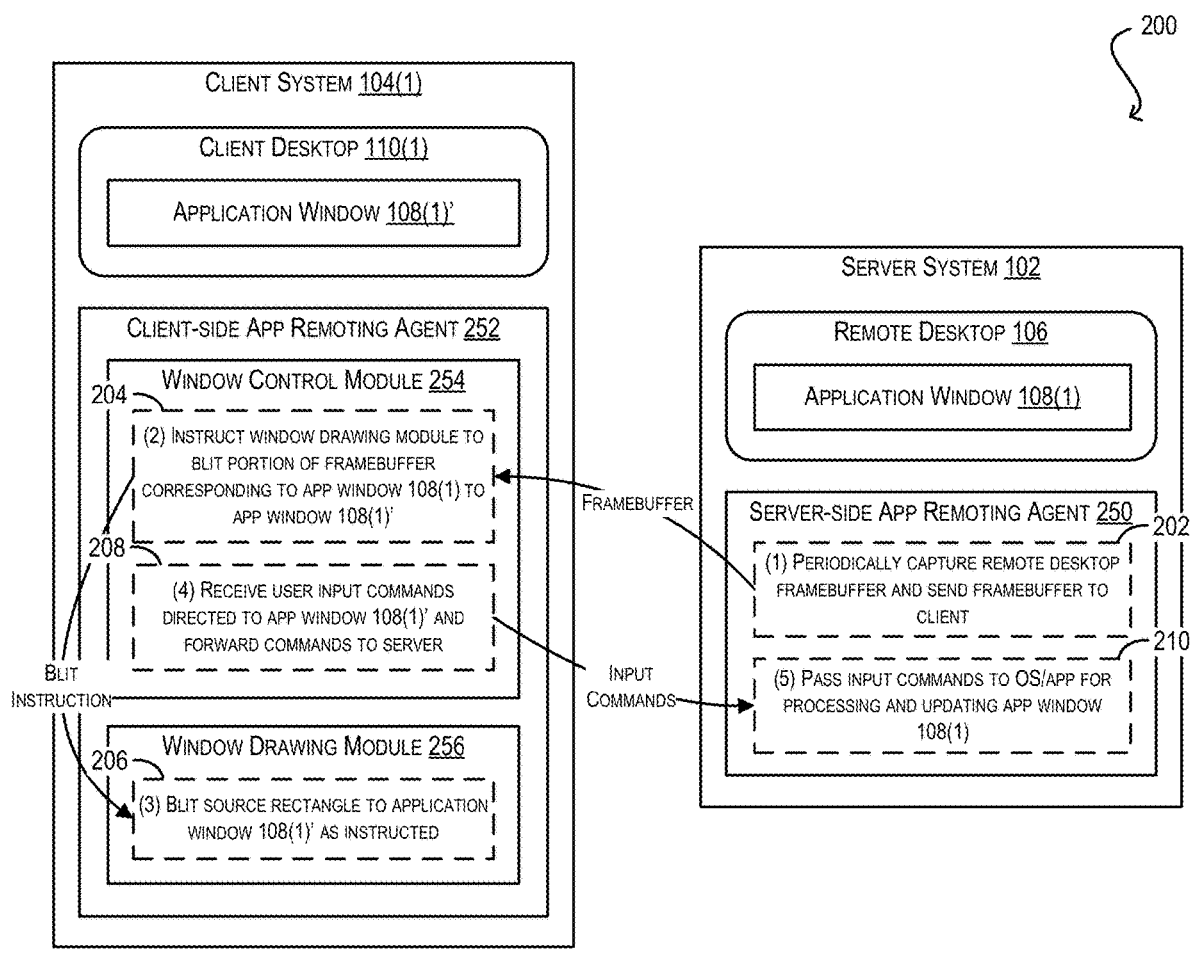
FIG. 2 depicts a workflow for performing app remoting according to an embodiment.

FIG. 2 depicts a more detailed view of client system 104(1) and server system 102, as well as a workflow 200 that enables the remoting of application window 108(1) according to an embodiment. Starting with step (1) of workflow 200 (reference numeral 202), a server-side app remoting agent 250 of server system 102 can periodically capture an image (e.g., framebuffer) of remote desktop 106 and can send, via a remoting protocol, the framebuffer (or an updated portion thereof) to a client-side app remoting agent 252 on client system 104(1). This can occur, e.g., once every 30 seconds, 60 seconds, or at a variable time interval depending on the quality of the connection between server system 102 and client system 104(1).

Upon receiving the remote desktop framebuffer, a window control module 254 of client-side agent 252 can instruct a window drawing module 256 to copy, or "blit," a portion of the framebuffer corresponding to application window 108(1) (referred to as the "source rectangle") into application window 108(1)' of client desktop 110(1) (step (2), reference numeral 204). Window drawing module 256 can then perform this blitting as instructed, thereby enabling the user to see a real-time (or near real-time) representation of application window 108(1) through application window 108(1)' (step (3), reference numeral 206).

Simultaneously with steps (1)-(3), window control module 252 can receive user input commands directed to application window 108(1)' and can forward the input commands, via the remoting protocol, to server-side agent 250 (step (4), reference numeral 208). At step (5) (reference numeral 210), server-side agent 250 can pass the input commands to the operating system (OS) layer of remote desktop 106 (and/or to the application owning window 108(1)). The OS/application can then process the input commands and update the visual state of application window 108(1) as needed (not shown). If the visual state of window 108(1) has changed, these changes will be propagated back to client-side agent 252 via the periodic framebuffer updates sent at step (1). This, in turn, will cause application window 108(1)' in client desktop 110(1) to be updated appropriately.

As mentioned previously, in high network latency environments, the act of moving a remoted application window can be a laggy experience due to the manner in which information is passed from client to server and vice versa. For instance, in the context of FIG. 2, assume the user of client system 104(1) initiates a move action with respect to application window 108(1)' of client desktop 110(1). In this case, (1) the input command(s) corresponding to the move action would need to be communicated to server-side agent 250, (2) the move action would need to be triggered/performed on application window 108(1) in remote desktop 106, and (3) a window move update would need to be sent back to client-side agent 252, all before application window 108(1)' can be updated in client desktop 110(1) to reflect the move. Further, this client-server roundtrip would need to be repeated for each increment of the move action until the window has reached its final location.

There are existing techniques that work around this problem by detecting a left-click-and-drag operation on the window titlebar area and optimizing the window move process in this specific scenario. However, these existing techniques still result in a poor/laggy user experience if the remoted application allows window move actions to be initiated via non-titlebar regions (as is the case with many web browsers).

Figure 3:
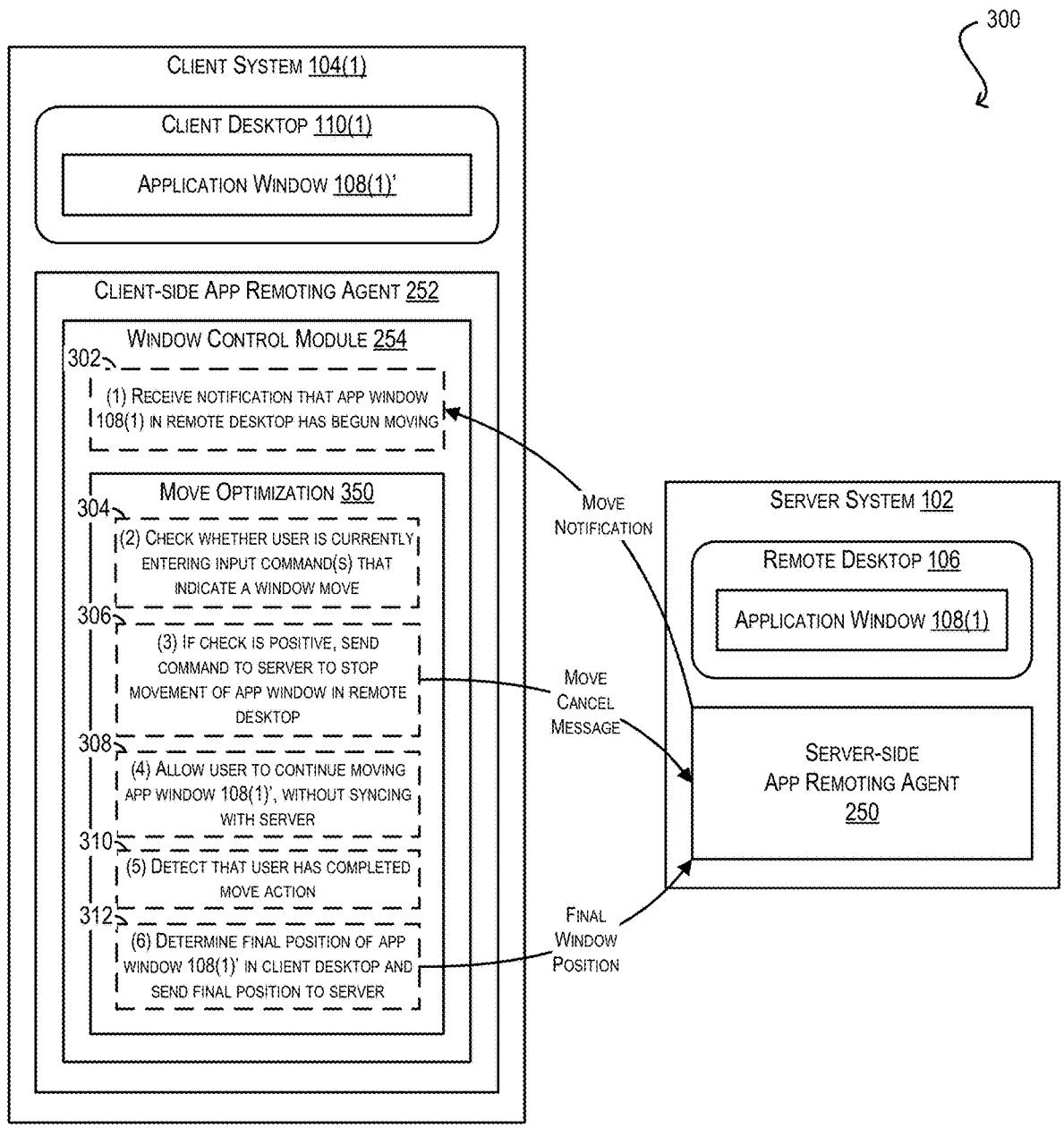
FIG. 3 depicts a workflow for optimizing window move actions for a remoted application according to an embodiment.

To address the foregoing and other similar issues, FIG. 3 depicts a workflow 300 that can be performed by client system 104(1) for optimizing user-initiated moves of client-side application window 108(1)' according to an embodiment. This workflow is enabled by a novel move optimization component 350 added to window control module 254 of client-side agent 252. With workflow 300, the user of client system 104(1) can move client-side application window 108(1)' as desired with minimal delay/lag, regardless of how the move is initiated by the user.

Starting with step (1) of workflow 300 (reference numeral 302), window control module 254 can receive, from server-side agent 250, a notification that application window 108(1) in remote desktop 106 has started moving (indicating that the user may have initiated a window move action from the client side). There are different ways in which server-side agent 250 can detect this movement. For example, in embodiments where the OS-level option "show window contents while moving" is enabled in remote desktop 106, server-side agent 250 can monitor the position of application window 108(1) every X milliseconds and look for any change in position. This technique is possible because window 108(1)'s position (as well as the positions of all other windows in remote desktop 106) will be updated on the fly by the OS when the "show window contents while moving" option is turned on.

Alternatively, server-side agent 250 can set an OS-level hook/API with respect to the application window 108(1), thereby enabling agent 250 to receive OS messages regarding state/status changes of the window. If server-side agent 250 receives a window move message from the OS via this hook/API, agent 250 can conclude that the window has started moving. It should be noted that this technique works even if the "show window contents while moving" option is disabled in remote desktop 106.

At step (2) (reference numeral 304), move optimization component 350 can check whether the user is currently entering any input commands that indicate a window move action is taking place. For instance, move optimization component 350 can check whether the user currently has the left mouse button held down (indicating a left-click-and-drag operation). Move optimization component 350 can also check for other types of input commands, such as whether the user is depressing an arrow key on his/her keyboard.

If the check at step (2) indicates that the user is not currently entering a window move command, workflow 300 can end (not shown). However, if the check indicates that the user is currently entering such a command, component 350 can initiate a move optimization process as shown in the remaining steps of workflow 300. In particular, at step (3) (reference numeral 306), move optimization component 350 can send a command to server-side agent 250 that cancels the movement of application window 108(1) within remote desktop 106. For example, this "move cancel" command can be a "left-mouse-button-up" event, or any other event/command that forces application window 108(1) to stop moving on the server side.

Move optimization component 350 can then allow the user to continue moving application window 108(1)' within client desktop 110(1), without synchronizing those movements to server system 102 (step (4), reference numeral 308). This reduces the latency experienced by the user during the move process, since there is no need for client system 104(1) to wait for window move updates from server system 102 before visually displaying the results of those movements on the client side.

At step (5) (reference numeral 310), move optimization component 350 can detect that the user has completed the window move action (by, e.g., letting go of the left mouse button or otherwise ceasing to provide the input command(s) that initiated the move). Finally at step (6) (reference numeral 312), move optimization component 350 can determine the final position of application window 108(1)' in client desktop 110(1) and can send a request to server-side agent 250 to move application window 108(1) in remote desktop 106 to the determined final position. This can cause server system 102 to fulfill the move request (not shown), thereby synchronizing the position of window 108(1) in remote desktop 106 with the position of window 108(1)' in client desktop 110(1).

Figure 4A:
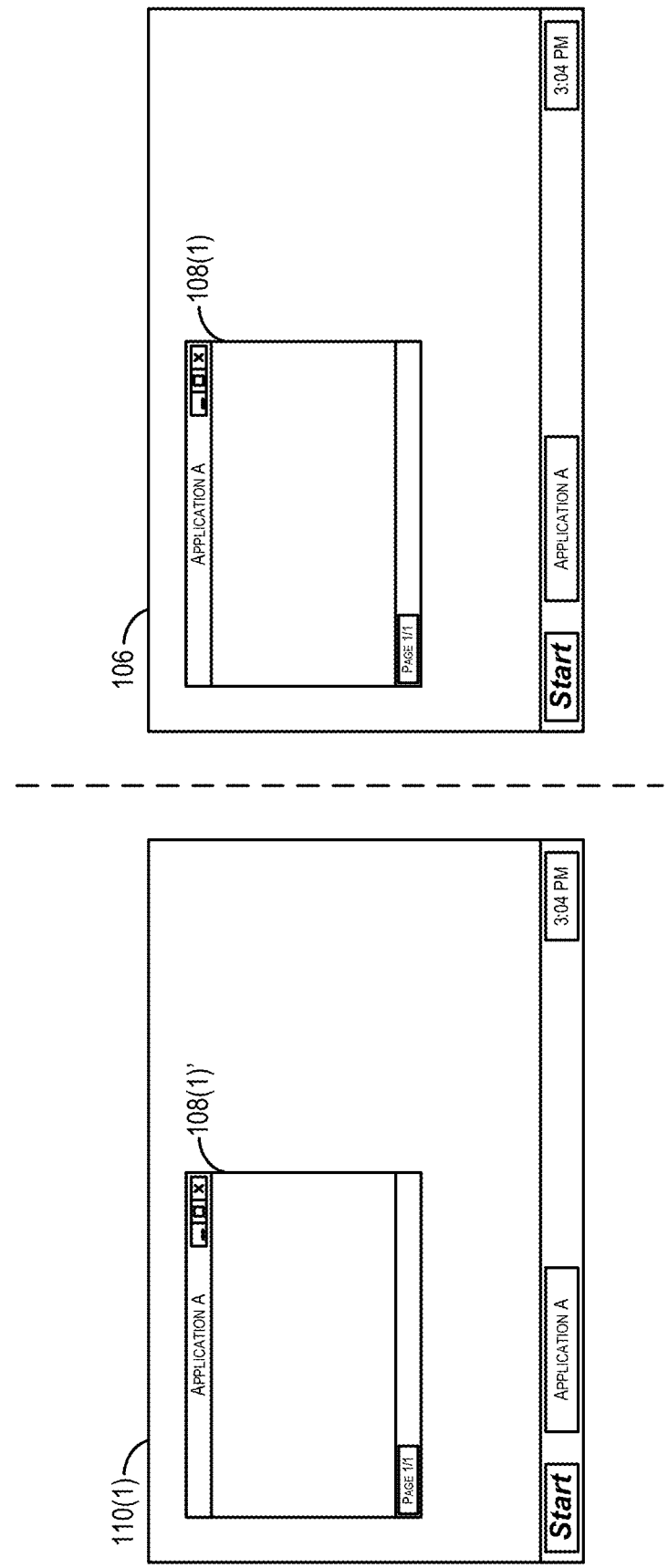
FIGS. 4A, 4B, and 4C illustrate the positions of an application window and a client-side application window in remote and client desktops respectively before, during, and after the workflow of FIG. 3 according to an embodiment.
Figure 4B:
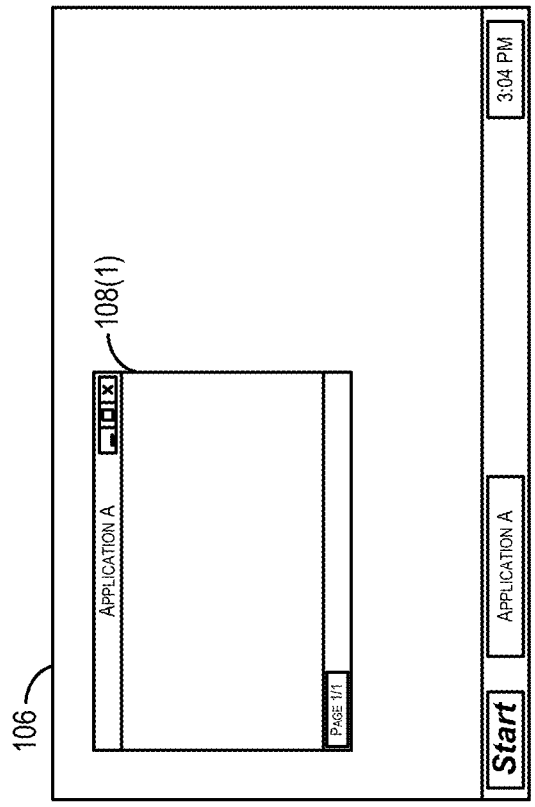
Figure 4B:
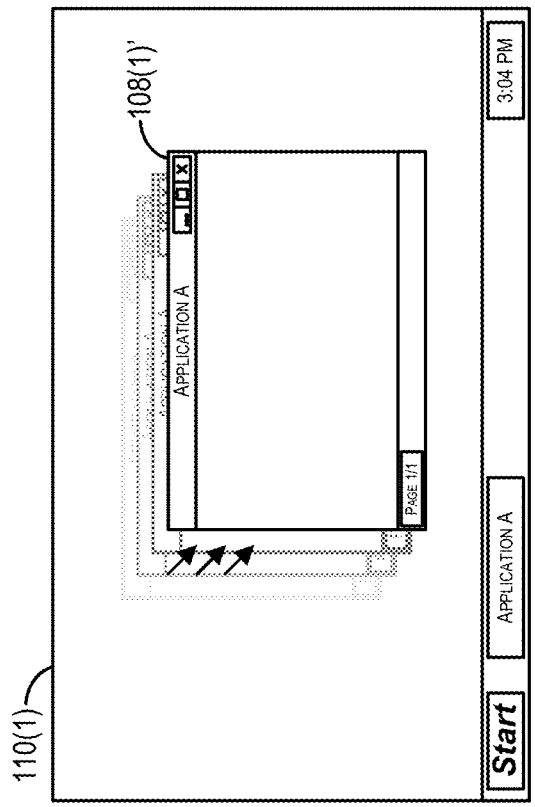
Figure 4C:
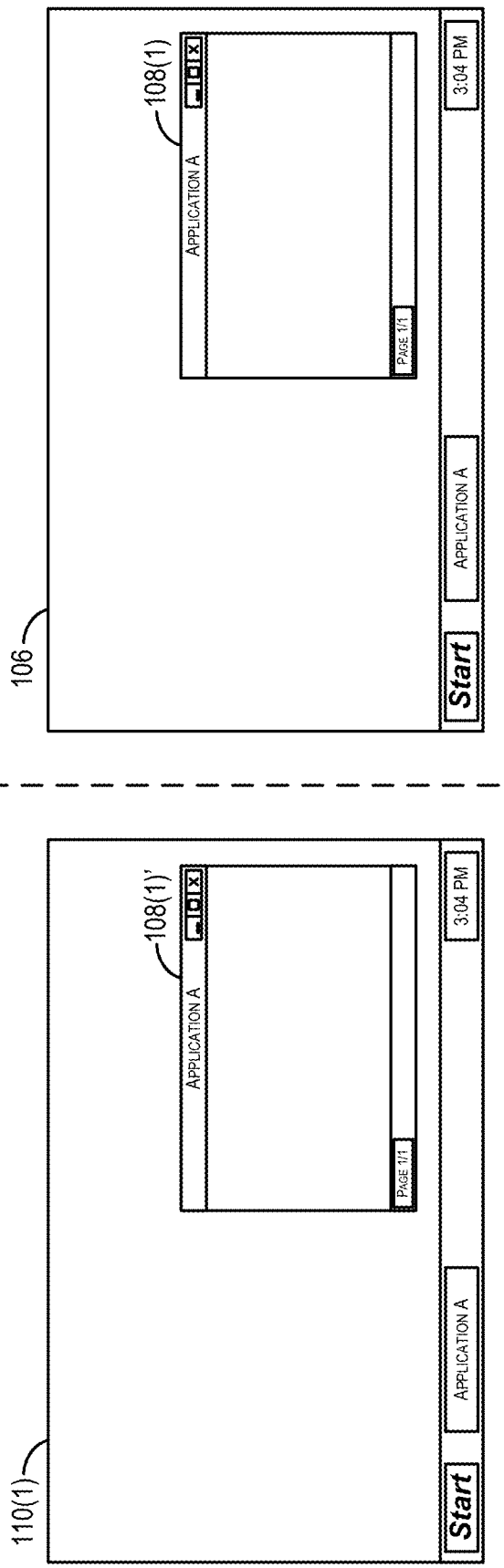

To further clarify the processing of workflow 300, FIGS. 4A, 4B, and 4C depict a series of diagrams 400, 402, and 404 that show the relative positions of application window 108(1)' in client desktop 110(1) and application window 108(1) in remote desktop 106 before, during, and after a user-initiated move action.

Starting with diagram 400 of FIG. 4A, application window 108(1)' and application window 108(1) are shown as being located at the same position in their respective desktops. This is because the windows are in-sync, and a move action has not yet occurred to disrupt this synchronization.

In diagram 402 of FIG. 4B, application window 108(1)' is in the process of moving to a new position in client desktop 110(1). In contrast, application window 108(1) has not moved (or has only moved a small amount) in remote desktop 106. This is because the movement of window 108(1)' has been effectively decoupled from window 108(1) per steps (3) and (4) of workflow 300.

Finally, in diagram 404 of FIG. 4C, windows 108(1)' and 108(1) are once again synchronized and located at the same position in their respective desktops. This new position is different from the original position in FIG. 4A, and reflects the final position of window 108(1)' at the conclusion of the move action.

Figure 5:
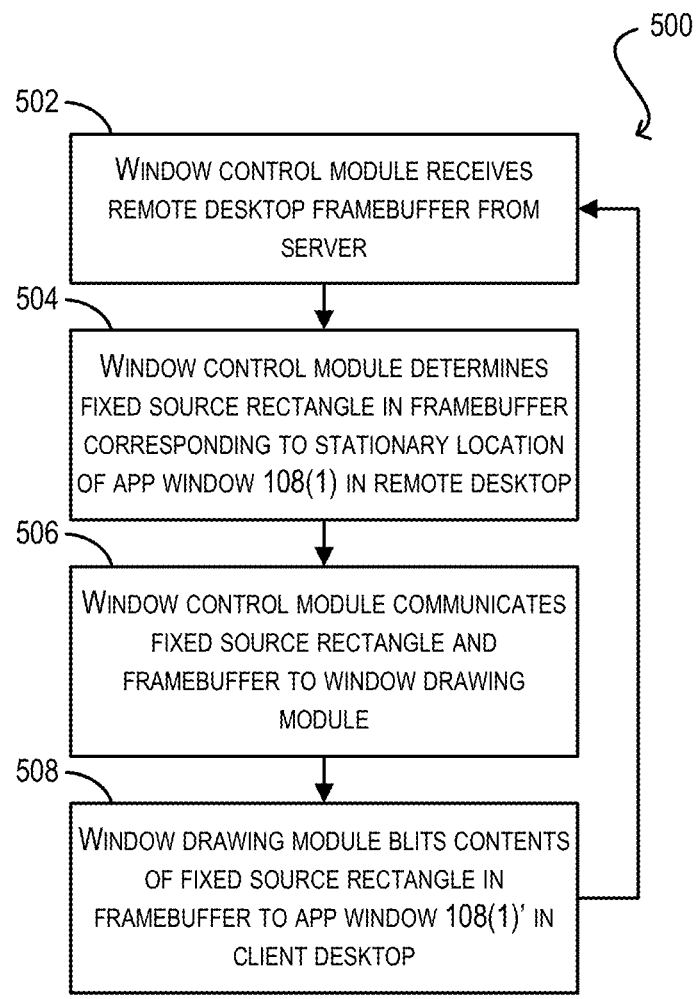
FIG. 5 depicts a flowchart for performing live-updating of a client-side application window during a window move action according to an embodiment.

In certain embodiments, due to the way in which the movement of application window 108(1) is stopped on the server side per step (3) of workflow 300, client-side agent 252 can efficiently "live-update" application window 108(1)' on the client side during the move process. In other words, client-side agent 252 can take advantage of the fixed position of application window 108(1) in remote desktop 106 to dynamically and continuously display the most current contents of this window within application window 108(1)' of client desktop 110(1), while window 108(1)' is being actively moved. FIG. 5 depicts a flowchart 500 of this process according to an embodiment. It is assumed that flowchart 500 is performed by client-side agent 252 during step (4) of workflow 300 (i.e., while the user of client system 104(1) is moving application window 108(1)' in client desktop 110(1)).

At block 502 of flowchart 500, window control module 254 of client-side agent 252 can receive a remote desktop framebuffer from server-side agent 250. Upon receiving this framebuffer, window control module 254 can determine a fixed source rectangle in the framebuffer that corresponds to the stationary location of application window 108(1)' (block 504).

At block 506, window control module 254 can communicate the fixed source rectangle and the framebuffer (or a pointer to the framebuffer) to window drawing module 256. Window drawing module 256 can then blit the contents of the fixed source rectangle to application window 108(1)' in client desktop 110(1). thereby updating window 108(1)' with the most current content of window 108(1) (block 508). Finally, flowchart 500 can return to block 502 so that further framebuffer updates from server-side agent 250 can be processed in the same manner.

As indicated above, since application window 108(1) has been forced to stop moving per step (3) of workflow 300, the position of the source rectangle will be the same for each loop iteration of flowchart 500 (for the duration of a single move action). Accordingly, there is no need for window control module 254 to continuously keep track of and update the rectangle position as the move is taking place.

One side effect of the optimized move techniques described above is that, in scenarios where there are multiple client-side application windows in client desktop 110(1) corresponding to multiple application windows in remote desktop 106, one or more of the client-side application windows may incorrectly display an overlapping portion of a foreground application window while that foreground window is being moved per the optimized move process of workflow 300.

Figure 6B:
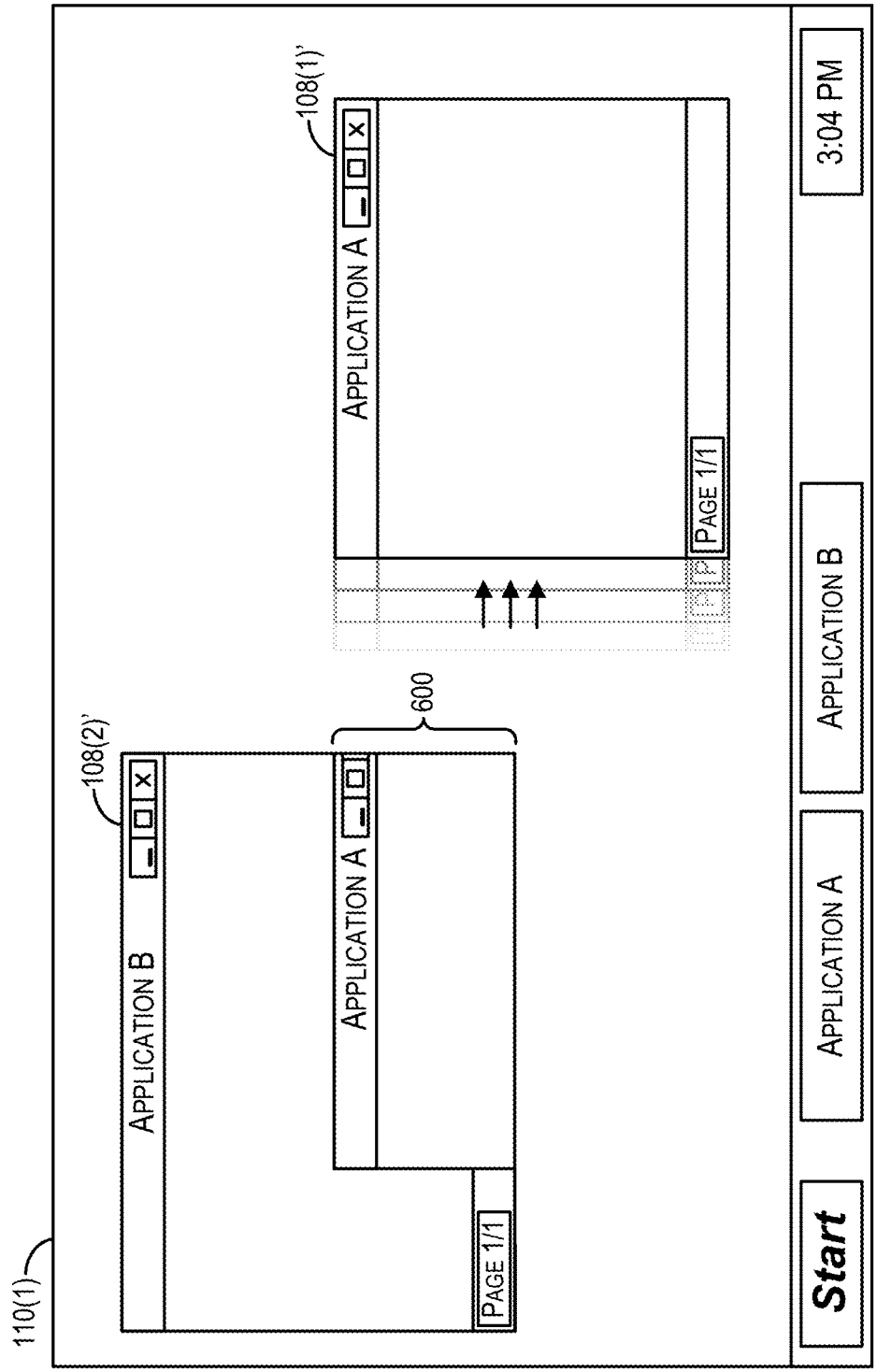
Figure 6C:
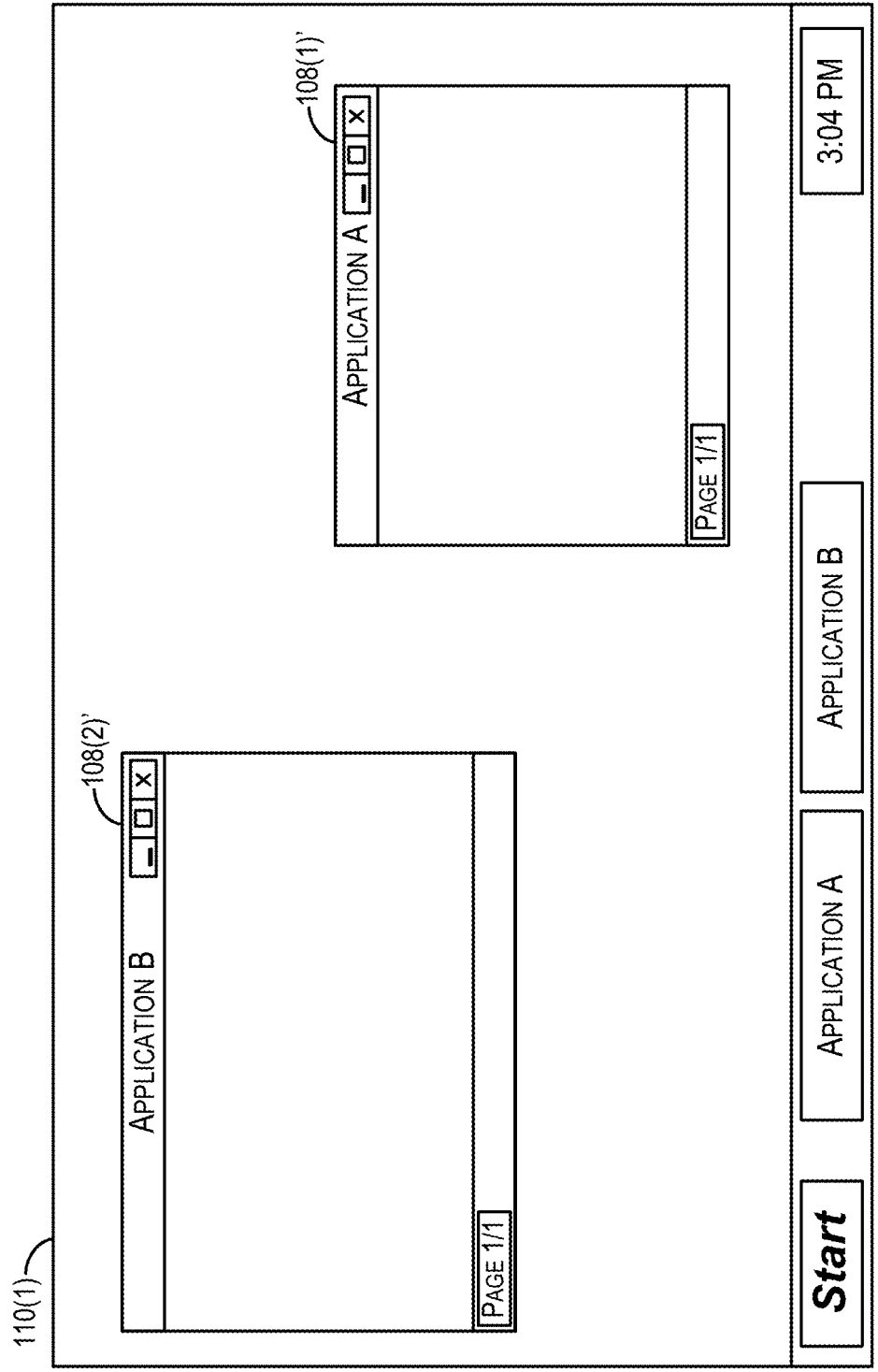

This issue is illustrated in FIGS. 6A, 6B, and 6C. FIG. 6A depicts an instance of client desktop 110(1) with two client-side application windows 108(1)' and 108(2)', before a window move action has been initiated. Although remote desktop 106 is not shown, it is assumed that client-side application windows 108(1)' and 108(2)' correspond to two application windows 108(1) and 108(2) respectively in remote desktop 106. Further, it is assumed that application window 108(1) overlaps application window 108(2) in remote desktop 106, in a manner similar to how client-side application window 108(1)' overlaps client-side application window 108(2)' in client desktop 110(1). Thus, windows 108(1)/108(1)' can be considered foreground windows and windows 108(2)/108(2)' can be considered background windows in their respective desktops.

In FIG. 6B, a user of client desktop 110(1) initiates a non-titlebar based move action with respect to client-side application window 108(1)', which causes the optimized move workflow of FIG. 3 to stop the movement of window 108(1) on the server side while allowing the user to freely move window 108(1)' on the client side. However, since application window 108(1) is frozen in a position where it overlaps application 108(2) in remote desktop 106, client-side application window 108(2)' continues to show an overlapping region 600 of window 108(1) within its window borders, even though the user is in the process of moving client-side application window 108(1)' to a completely different, non-overlapping area of client desktop 110(1). This is because the content of client side application window 108 (2)' is updated on a continuous basis based on the current state of remote desktop 106 (per workflow 200 of FIG. 2), rather than client desktop 110(1).

Finally, in FIG. 6C, the move of client-side application window 108(1)' ends, which causes the position of application window 108(1) in remote desktop 106 to be synchronized with the new position of window 108(1)' in client desktop 110(1). This, in turn, causes overlapping region 600 shown in FIG. 6B to disappear from client-side application window 108(2)', since window 108(1) no longer overlaps window 108(2) on the server side.

Figure 7:
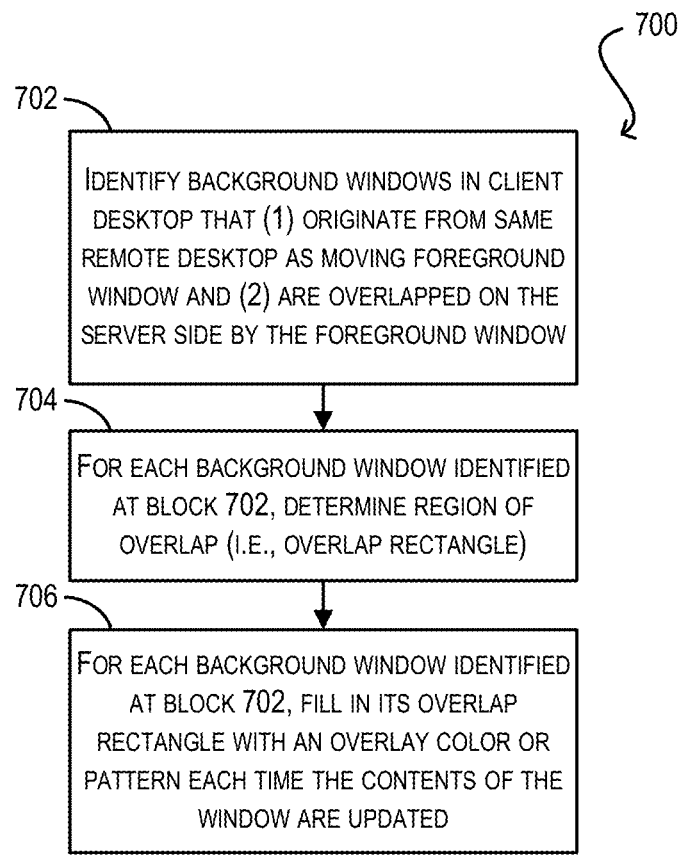
FIG. 7 depicts a flowchart for hiding an overlap region within the background client-side application window of FIG. 6B according to an embodiment.

To hide the appearance of overlapping region 600 in the scenario of FIGS. 6A-6C (and other similar scenarios), FIG. 7 depicts a flowchart 700 that can be performed by client-side agent 252 while the user is actively moving client-side application window 108(1)' within client desktop 110(1) (i.e., during step (4) of workflow 300). Flowchart 700 may be implemented using any component or combination of components of client-side agent 252, such as window control module 254, window drawing module 256, and/or move optimization component 350.

At block 702, client-side agent 252 can identify the background client-side application windows in client desktop 110(1) that (1) originate from the same remote desktop as the foreground client-side application window being moved (i.e., window 108(1)'); and (2) whose server-side application windows are overlapped by the server-side application window of that moving client-side window. For example, in the scenario of FIGS. 6A-6C, client-side agent 252 would identify client-side application window 108(2)', since its server-side application window 108(2) is overlapped by window 108(1) in remote desktop 106.

At block 704, client-side agent 252 can determine, for each background client-side application window identified at block 702, the region of its server-side application window that is overlapped by the server-side application window of the moving client-side window. Client-side agent 252 can determine this overlapped region as, e.g., a series of coordinates that specify an "overlap rectangle."

Then, at block 706, client-side agent 252 can cause, for each background client-side application window, the overlap rectangle to be filled in with an overlay color or pattern (e.g., a black or gray color) each time the contents of that window are updated. This prevents the background client-side application window from displaying the overlapping portion of the foreground window within its window borders, since the foreground window is in the process of being moved (and thus will likely be in a different position on the client-side).

Figure 8:
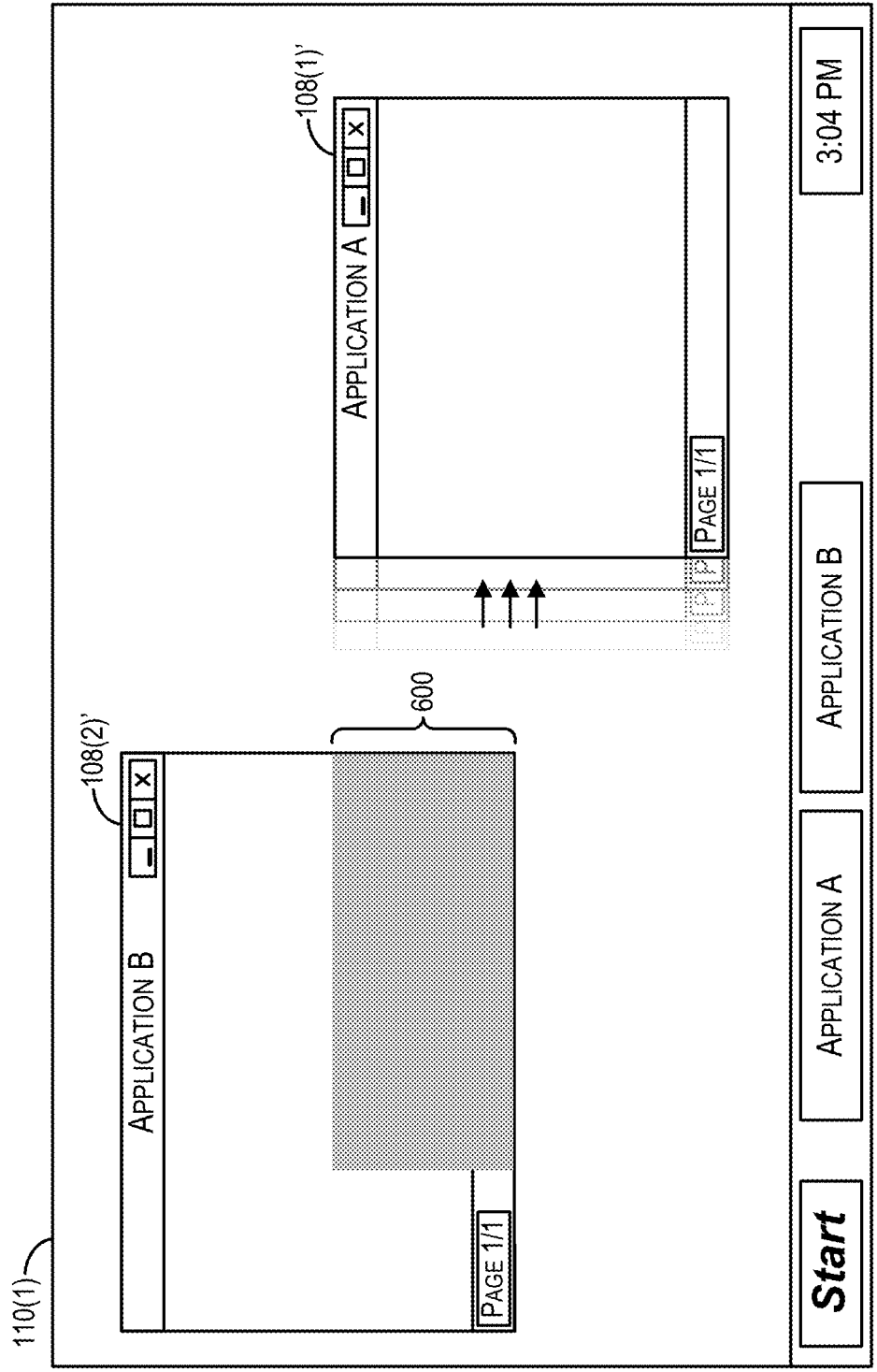
FIG. 8 depicts an alternative version of FIG. 6B that shows the overlap region as being hidden according to an embodiment.

By way of example, FIG. 8 depicts an alternative version of FIG. 6B (i.e., the state of client desktop 110(1) during the move of client-side application window 108(1)') in a scenario where flowchart 700 is utilized. As shown in FIG. 8, region 600 of client-side application window 108(2)' is now filled into with a flat gray overlay, rather than the overlapping portion of window 108(1) as depicted in FIG. 6B. Client-side application window 108(2)' will continue to show this gray overlay in region 600 until the move action is finished, at which point region 600 will disappear per FIG. 6C.

It should be noted that the solution of FIG. 7 is not limited to being used with the specific move optimization workflow described with respect to FIG. 3. Instead, this solution may be used to hide overlap regions in any move optimization process where the server-side instance of the moving client-side window is not in sync with the moving client-side window itself. For instance, this solution may be used in conjunction with the titlebar-based move optimization mentioned in the Background section.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for optimizing window move actions for a remoted application, wherein the remoted application has an application window running within a remote desktop of a server system, and wherein the application window is made accessible to a user of a client system in the form of a client-side application window displayed in a client desktop of the client system, the method comprising:
   determining, by the client system, that the user has begun moving the client-side application window in the client desktop;
   sending, by the client system to the server system, a command for fixing the application window in a stationary position in the remote desktop; and
   while the user continues moving the client-side application window in the client desktop:
      determining, by the client system, a fixed area in the remote desktop that corresponds to the stationary position of the application window in the remote desktop;
      receiving, by the client system, a remote desktop framebuffer from the server system; and
      copying, by the client system, a portion of the remote desktop framebuffer covered by the fixed area to the client-side application window in the client desktop.

2. The method of claim 1 wherein the client system repeats the steps of receiving the remote desktop framebuffer and copying the portion of the remote desktop framebuffer covered by the fixed area on a periodic basis until the user finishes moving the client-side application window in the client desktop.

3. The method of claim 1 further comprising:
determining that the user has finished moving the client-side application window;
determining a final position of the client-side application window in the client desktop; and
sending a request to the server system for moving the application window in the remote desktop to the final position.

4. The method of claim 1 wherein copying the portion of remote desktop framebuffer covered by the fixed area to the client-side application window in the client window comprises:
blitting the portion into the client-side application window, the blitting causing the client-side application window to display the most current content of the application window in the remote desktop.

5. The method of claim 1 wherein the application window remains fixed in the stationary position in the remote desktop until the user finishes moving the client-side application window.

6. The method of claim 1 wherein determining that the user has begun moving the client-side application window in the client desktop comprises:
receiving, from the server system, a notification that the application window has begun moving in the remote desktop.

7. The method of claim 6 wherein the command for fixing the application window in the stationary position is a command instructing the server system to stop or cancel movement of the application window in the remote desktop.

8. A non-transitory computer readable medium having stored thereon software executable by a client system, the software embodying a method for optimizing window move actions for a remoted application, wherein the remoted application has an application window running within a remote desktop of a server system, and wherein the application window is made accessible to a user of the client system in the form of a client-side application window displayed in a client desktop of the client system, the method comprising:
determining that the user has begun moving the client-side application window in the client desktop;
sending, to the server system, a command for fixing the application window in a stationary position in the remote desktop; and
while the user continues moving the client-side application window in the client desktop:
determining a fixed area in the remote desktop that corresponds to the stationary position of the application window in the remote desktop;
receiving a remote desktop framebuffer from the server system; and
copying a portion of the remote desktop framebuffer covered by the fixed area to the client-side application window in the client desktop.

9. The non-transitory computer readable medium of claim 8 wherein the client system repeats the steps of receiving the remote desktop framebuffer and copying the portion of the remote desktop framebuffer covered by the fixed area on a periodic basis until the user finishes moving the client-side application window in the client desktop.

10. The non-transitory computer readable medium of claim 8 wherein the method further comprises:
determining that the user has finished moving the client-side application window;
determining a final position of the client-side application window in the client desktop; and
sending a request to the server system for moving the application window in the remote desktop to the final position.

11. The non-transitory computer readable medium of claim 8 wherein copying the portion of remote desktop framebuffer covered by the fixed area to the client-side application window in the client window comprises:
blitting the portion into the client-side application window, the blitting causing the client-side application window to display the most current content of the application window in the remote desktop.

12. The non-transitory computer readable medium of claim 8 wherein the application window remains fixed in the stationary position in the remote desktop until the user finishes moving the client-side application window.

13. The non-transitory computer readable medium of claim 8 wherein determining that the user has begun moving the client-side application window in the client desktop comprises:
receiving, from the server system, a notification that the application window has begun moving in the remote desktop.

14. The non-transitory computer readable medium of claim 13 wherein the command for fixing the application window in the stationary position is a command instructing the server system to stop or cancel movement of the application window in the remote desktop.

15. A client system comprising:
a processor; and
a non-transitory computer readable medium having stored thereon program code for optimizing window move actions for a remoted application, wherein the remoted application has an application window running within a remote desktop of a server system, and wherein the application window is made accessible to a user of the client system in the form of a client-side application window displayed in a client desktop of the client system,
the program code causing the processor to:
determine that the user has begun moving the client-side application window in the client desktop;
send, to the server system, a command for fixing the application window in a stationary position in the remote desktop; and
while the user continues moving the client-side application window in the client desktop:
determine a fixed area in the remote desktop that corresponds to the stationary position of the application window in the remote desktop;
receive a remote desktop framebuffer from the server system; and
copy a portion of the remote desktop framebuffer covered by the fixed area to the client-side application window in the client desktop.

16. The client system of claim 15 wherein the program code further causes the processor to repeat the steps of receiving the remote desktop framebuffer and copying the portion of the remote desktop framebuffer covered by the fixed area on a periodic basis until the user finishes moving the client-side application window in the client desktop.

17. The client system of claim 15 wherein the program code further causes the processor to:

determine that the user has finished moving the client-side application window;

determine a final position of the client-side application window in the client desktop; and send a request to the server system for moving the application window in the remote desktop to the final position.

18. The client system of claim 15 wherein copying the portion of remote desktop framebuffer covered by the fixed area to the client-side application window in the client window comprises:

blitting the portion into the client-side application window, the blitting causing the client-side application window to display the most current content of the application window in the remote desktop.

19. The client system of claim 15 wherein the application window remains fixed in the stationary position in the remote desktop until the user finishes moving the client-side application window.

20. The client system of claim 15 wherein determining that the user has begun moving the client-side application window in the client desktop comprises:

receiving, from the server system, a notification that the application window has begun moving in the remote desktop.

21. The client system of claim 20 wherein the command for fixing the application window in the stationary position is a command instructing the server system to stop or cancel movement of the application window in the remote desktop.

* * * * *